(12) United States Patent
Tsukada et al.

(10) Patent No.: US 10,384,720 B2
(45) Date of Patent: Aug. 20, 2019

(54) IMPACT LOAD REDUCTION STRUCTURE

(71) Applicant: SUBARU CORPORATION, Tokyo (JP)

(72) Inventors: Takehisa Tsukada, Tokyo (JP); Hiroshi Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 15/792,552

(22) Filed: Oct. 24, 2017

(65) Prior Publication Data

US 2018/0043936 A1    Feb. 15, 2018

Related U.S. Application Data

(62) Division of application No. 15/261,632, filed on Sep. 9, 2016, now Pat. No. 9,821,850.

(30) Foreign Application Priority Data

Sep. 30, 2015    (JP) .................. 2015-193462

(51) Int. Cl.
  *B60J 7/00* (2006.01)
  *B62D 21/15* (2006.01)
  (Continued)

(52) U.S. Cl.
  CPC ............ *B62D 21/15* (2013.01); *B60K 1/04* (2013.01); *B60L 3/0007* (2013.01); *B60L 50/64* (2019.02);
  (Continued)

(58) Field of Classification Search
  CPC ............ B62D 25/2018; B62D 21/152; B62D 21/155; B62D 25/082; B60K 1/04;
  (Continued)

(56) References Cited

U.S. PATENT DOCUMENTS 3,708,028 A * 1/1973 Hafer .................. B60K 1/04
                                                104/34
4,365,681 A * 12/1982 Singh .................. B60K 1/04
                                                105/51

(Continued)

FOREIGN PATENT DOCUMENTS

JP    H06-270692 A    9/1994
JP    H10-291419 A    11/1998
(Continued)

OTHER PUBLICATIONS

United States Notice of Allowance dated Jul. 17, 2017 in U.S. Appl. No. 15/261,632.

(Continued)

*Primary Examiner* — Kiran B Patel
(74) *Attorney, Agent, or Firm* — McGinn I.P. Law Group, PLLC.

(57) ABSTRACT

An impact load reduction includes: a crash area that is disposed in a front section of the electrically-powered vehicle and configured to deform at a collision; a battery frame that is disposed rearward of the crash area and fixed to a vehicle body frame of the electrically-powered vehicle, the battery frame being configured to support the battery and be engaged with the vehicle body frame in accordance with an inertia force of the collision to be supported from frontward; a load reduction frame that extends in a front-rear direction on a front side of the battery frame and that is disposed in a substantially same plane as the battery frame, the load reduction frame having lower rigidity than the battery frame; and a load absorber that is disposed between the load reduction frame and the battery frame and that has lower rigidity than the battery frame.

8 Claims, 3 Drawing Sheets

(51) Int. Cl.
| | | |
|---|---|---|
| *B60K 1/04* | (2019.01) | |
| *B62D 25/02* | (2006.01) | |
| *B62D 25/08* | (2006.01) | |
| *B62D 25/20* | (2006.01) | |
| *B60L 3/00* | (2019.01) | |
| *B60L 50/60* | (2019.01) | |
| *B60L 50/64* | (2019.01) | |

(52) U.S. Cl.
CPC ............ *B60L 50/66* (2019.02); *B62D 21/155* (2013.01); *B62D 25/025* (2013.01); *B62D 25/082* (2013.01); *B62D 25/2018* (2013.01); B60K 2001/0438 (2013.01); B60Y 2306/01 (2013.01); Y02T 10/705 (2013.01); Y02T 10/7005 (2013.01)

(58) Field of Classification Search
CPC ........... H01L 2924/00; H01L 2224/743; H01L 2924/12042; H01L 2924/14; G01G 19/12
USPC ..................................................... 296/187.03
See application file for complete search history.

(56) References Cited

U.S. PATENT DOCUMENTS

| | | | | |
|---|---|---|---|---|
| 5,390,754 | A * | 2/1995 | Masuyama | B60K 1/04 105/51 |
| 5,409,264 | A * | 4/1995 | Nakatani | B60K 15/03504 280/784 |
| 5,918,692 | A * | 7/1999 | Sekita | B60G 3/14 180/56 |
| 6,273,486 | B1 * | 8/2001 | Ezzat | B62D 27/00 296/187.09 |
| 7,004,502 | B2 * | 2/2006 | Borroni-Bird | B62D 21/152 180/402 |
| 7,036,616 | B1 * | 5/2006 | Kejha | B60K 6/442 429/532 |
| 7,104,596 | B2 * | 9/2006 | Goto | B62D 25/2018 296/187.08 |
| 7,178,861 | B2 * | 2/2007 | Yamada | B62D 21/09 296/187.08 |
| 7,185,934 | B2 * | 3/2007 | Saeki | B62D 39/00 296/35.2 |
| 7,188,893 | B2 * | 3/2007 | Akasaka | B62D 21/152 296/187.08 |
| 7,699,385 | B2 * | 4/2010 | Kurata | B62D 25/2036 296/187.08 |
| 7,748,774 | B2 * | 7/2010 | Kurata | B62D 25/2036 296/187.08 |
| 8,079,435 | B2 * | 12/2011 | Takasaki | B60K 1/04 180/65.1 |
| 8,128,154 | B2 * | 3/2012 | Egawa | B62D 25/2036 296/187.12 |
| 8,177,293 | B2 * | 5/2012 | Boettcher | B62D 33/023 29/401.1 |
| 8,182,393 | B2 * | 5/2012 | Gillingham | B60K 1/04 477/10 |
| 8,276,980 | B2 * | 10/2012 | Boettcher | B62D 25/2018 296/193.07 |
| 8,286,743 | B2 * | 10/2012 | Rawlinson | F41H 7/042 180/68.5 |
| 8,387,734 | B2 * | 3/2013 | Krosschell | B60G 9/003 180/89.11 |
| 8,393,669 | B2 * | 3/2013 | Ajisaka | B62D 21/152 296/187.09 |
| 8,424,960 | B2 * | 4/2013 | Rawlinson | B62D 21/152 296/187.09 |
| 8,517,136 | B2 * | 8/2013 | Hurd | B60K 5/1241 180/233 |
| 8,540,259 | B1 * | 9/2013 | Young | B62D 21/155 280/124.109 |
| 8,631,886 | B2 * | 1/2014 | Kawamura | B60K 5/04 180/65.22 |
| 8,632,121 | B1 * | 1/2014 | Sundararajan | B62D 21/157 296/187.08 |
| 8,708,401 | B2 * | 4/2014 | Lee | B62D 21/152 280/124.109 |
| 8,733,487 | B2 * | 5/2014 | Usami | B60K 1/04 180/68.5 |
| 8,820,452 | B2 * | 9/2014 | Iwasa | B60K 1/04 180/68.2 |
| 8,863,878 | B2 * | 10/2014 | Shirooka | B60K 1/04 180/68.5 |
| 8,875,828 | B2 * | 11/2014 | Rawlinson | B60K 1/04 180/68.5 |
| 8,899,360 | B2 * | 12/2014 | Mochizuki | B60R 16/0215 180/65.1 |
| 8,944,449 | B2 * | 2/2015 | Hurd | B60K 5/00 280/124.152 |
| 9,045,030 | B2 * | 6/2015 | Rawlinson | B60K 1/04 |
| 9,096,133 | B2 * | 8/2015 | Kohler | B60L 11/126 |
| 9,139,074 | B2 * | 9/2015 | Jarocki | B60K 1/04 |
| 9,221,508 | B1 * | 12/2015 | de Haan | B60N 2/90 |
| 9,259,998 | B1 * | 2/2016 | Leanza | B60K 1/04 |
| 9,281,505 | B2 * | 3/2016 | Hihara | B60K 1/04 |
| 9,650,078 | B2 * | 5/2017 | Kinsman | B60G 3/20 |
| 9,673,433 | B1 * | 6/2017 | Pullalarevu | H01M 2/1083 |
| 2017/0088178 | A1 * | 3/2017 | Tsukada | B60K 1/04 |
| 2017/0088181 | A1 * | 3/2017 | Tsukada | B60K 1/04 |

FOREIGN PATENT DOCUMENTS

| | | |
|---|---|---|
| JP | 2001-097048 A | 4/2001 |
| JP | 2012-232667 A | 11/2012 |
| JP | 2012-240586 A | 12/2012 |
| JP | 2013-014276 A | 1/2013 |
| WO | WO 2014/038346 A1 | 3/2014 |

OTHER PUBLICATIONS

JPO Decision to Grant dated Jan. 31, 2017.
JPO Notification of Refusal dated Sep. 29, 2016, with English translation thereof.
Japanese Office Action dated Nov. 29, 2016 with an English translation thereof.

* cited by examiner

IMPACT LOAD REDUCTION STRUCTURE

CROSS-REFERENCE TO RELATED APPLICATIONS

The present application is a Continuation Application of U.S. patent application Ser. No. 15/261,632, filed on Sep. 9, 2016, which is based on Japanese Patent Application No. 2015-193462 filed on Sep. 30, 2015, the entire contents of which are hereby incorporated by reference.

BACKGROUND

1. Technical Field

The present invention relates to impact load reduction structures, and particularly, to an impact load reduction structure that reduces an impact load transmitted to a battery for driving an electrically-powered vehicle.

2. Related Art

Batteries installed in electrically-powered vehicles, such as electric vehicles and hybrid vehicles, require large capacity and have large weight. Therefore, an electrically-powered vehicle is normally provided with a battery frame for supporting a battery. For instance, the battery frame is provided in a large space under the floor of the vehicle cabin, and a plurality of batteries are collectively disposed within the battery frame. There is a demand for a technology for suppressing an input of a large external impact load when an electrically-powered vehicle is involved in a collision.

As an impact load reduction structure that reduces transmission of an impact load to a battery, for instance, Japanese Unexamined Patent Application Publication (JP-A) No. 2013-14276 proposes an electric-vehicle battery support structure that can reliably distribute a load input from the front section of the vehicle. This electric-vehicle battery support structure is provided with a protrusion that protrudes downward from the floor surface, extends in the front-rear direction of the vehicle, and supports batteries. The front end of this protrusion is coupled to the rear end of a front side frame. Accordingly, a load input to the front side frame from the front section of the vehicle can be transmitted and distributed to the rear of the vehicle via the protrusion.

However, in the electric-vehicle battery support structure in JP-A No. 2013-14276, a vehicle body frame, such as the front side frame, is securely fixed to the protrusion, which supports the batteries, from the front side. Thus, when the front section of the electric vehicle makes a collision, an impact load transmitted through the vehicle body frame is input to the protrusion at once, possibly causing a large impact load to be input to the batteries.

SUMMARY OF THE INVENTION

It is desirable to provide an impact load reduction structure that reliably reduces an impact load transmitted to a battery.

An aspect of the present invention provides an impact load reduction structure that reduces an impact load transmitted to a battery for driving an electrically-powered vehicle. The impact load reduction structure includes a battery frame, a load reduction frame, and a load absorber. The battery frame is fixed to a vehicle body frame of the electrically-powered vehicle and supports the battery. The load reduction frame extends in a front-rear direction on a front side of the battery frame and is disposed in a substantially same plane as the battery frame. The load absorber is disposed between the load reduction frame and the battery frame and absorbs the impact load to be transmitted from the load reduction frame to the battery frame.

The battery frame may be disposed under a floor of a vehicle cabin, and the load reduction frame may be disposed so as to extend rearward from near a front section of the electrically-powered vehicle.

Furthermore, the load absorber may have lower rigidity than the battery frame and higher rigidity than the load reduction frame.

Furthermore, the load reduction frame may have lower rigidity than the battery frame, and the load absorber may have lower rigidity than the load reduction frame.

Furthermore, the vehicle body frame may have front side frames in pairs spaced apart from each other in a vehicle width direction and extending rearward from near a front section of the electrically-powered vehicle, floor side frames in pairs that are coupled to rear ends of the front side frames and that extend rearward under a floor of a vehicle cabin, and side sills in pairs disposed so as to extend in the front-rear direction alongside the floor side frames. The load absorber may be disposed so as to extend in the vehicle width direction, and opposite ends of the load absorber may be fixed to either one of the pair of front side frames, the pair of side sills, and the pair of floor side frames.

Furthermore, the vehicle body frame may have front side frames in pairs spaced apart from each other in a vehicle width direction and extending rearward from near a front section of the electrically-powered vehicle and may also have floor side frames in pairs coupled to rear ends of the front side frames and extending rearward under a floor of a vehicle cabin. The load reduction frame may be fixed to the front side frames. The battery frame may be disposed within the floor side frames and may be fixed to the floor side frames.

DETAILED DESCRIPTION

Examples of the present invention will be described below with reference to the appended drawings.

First Example

Figure 1:
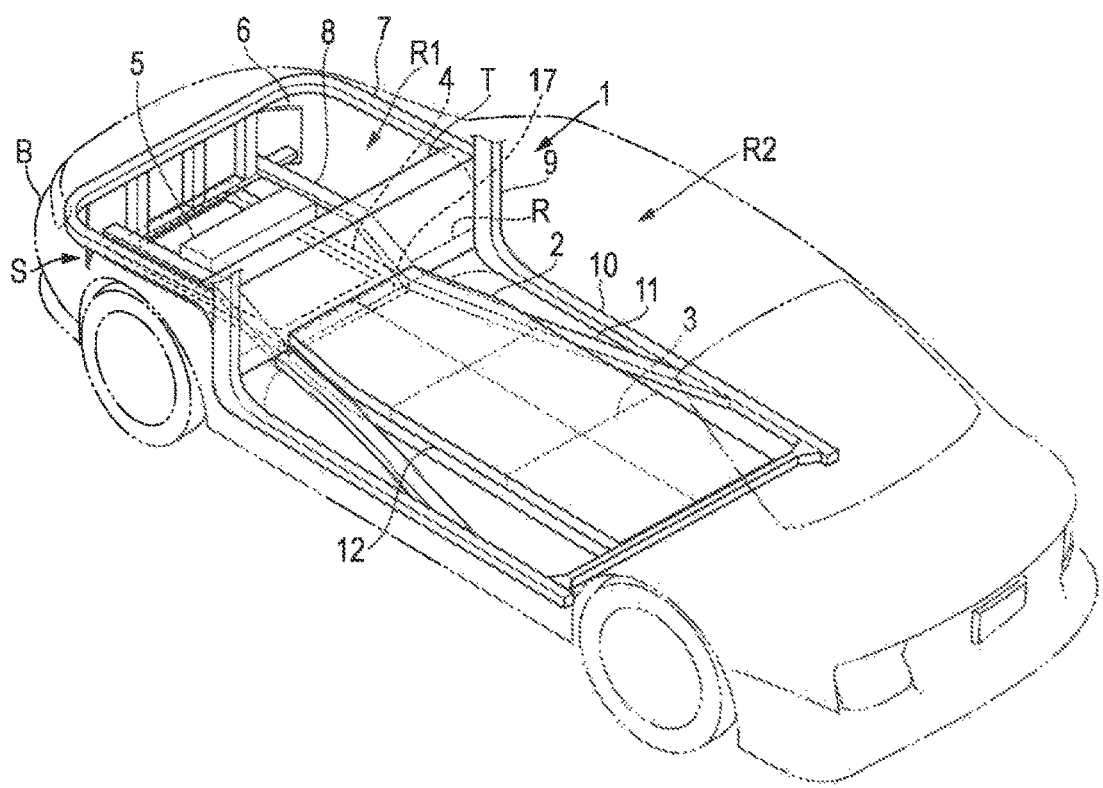
FIG. 1 illustrates the configuration of a vehicle equipped with an impact load reduction structure according to a first example of the present invention.

FIG. 1 illustrates the configuration of an electric vehicle equipped with an impact load reduction structure according to a first example of the present invention. This electric vehicle has a vehicle body frame 1 that supports a vehicle body, a battery housing 2 fixed to the vehicle body frame 1, a plurality of batteries 3 disposed within the battery housing 2, a sub frame 4 disposed on the front side of the battery housing 2, and a driving unit 5 electrically coupled to the plurality of batteries 3 via wires (not illustrated).

The vehicle body frame 1 has a bumper frame 6, a pair of front upper frames 7, a pair of front side frames 8, a pair of front pillars 9, a pair of side sills 10, and a pair of floor side frames 11.

The bumper frame 6 is disposed at the front section of the electric vehicle and supports a bumper B. The bumper frame 6 extends in a curved manner in the vehicle width direction. The bumper frame 6 and the bumper B have a crash area S that deforms first and absorbs an impact load when the front section of the electric vehicle makes a collision.

The front upper frames 7 extend rearward from near the front section of the electric vehicle along the opposite sides thereof, and the rear ends of the front upper frames 7 are coupled to the front pillars 9.

The front side frames 8 extend in the front-rear direction within the front upper frames 7. The front ends of the front side frames 8 are coupled to the bumper frame 6, and the rear ends of the front side frames 8 are coupled to the floor side frames 11. Moreover, the rear ends of the front side frames 8 are coupled to the side sills 10 via a rigid member R, such as a torque box.

The front pillars 9 extend in the up-down direction at the opposite sides of the electric vehicle, and a toe board T is disposed so as to couple the front pillars 9 to each other. A front chamber R1 is formed on the front side of the toe board T, and a vehicle cabin R2 is formed on the rear side of the toe board T.

The front ends of the side sills 10 are coupled to the lower ends of the front pillars 9. The side sills 10 are formed under the floor of the vehicle cabin R2 so as to extend rearward along the opposite sides of the electric vehicle.

The floor side frames 11 extend in the front-rear direction within the side sills 10. The front ends of the floor side frames 11 are coupled to the front side frames 8, and the rear ends of the floor side frames 11 are coupled to the side sills 10. Therefore, the floor side frames 11 are disposed so as to expand sideways gradually from the front ends toward the rear ends. Specifically, the floor side frames 11 extend rearward while the distance between one floor side frame 11 and the other floor side frame 11 gradually increases.

The battery housing 2 is for securely fixing the positions of the plurality of batteries 3 accommodated therein. The battery housing 2 collectively covers the plurality of batteries 3 and has high rigidity. The battery housing 2 is disposed so as to extend between the floor side frames 11 under the floor of the vehicle cabin R2. Below the battery housing 2, a box-shaped battery frame 12 is provided along the outer edges of the battery housing 2. The batteries 3 are supported from below by this battery frame 12.

The batteries 3 are charged by electric power supplied from an external power source and are accommodated within the battery housing 2. The batteries 3 have large capacity for driving the driving unit 5 and also have large weight. Therefore, the weight of the battery housing 2 accommodating the batteries 3 is extremely large at, for instance, about 300 kg.

The sub frame 4 is disposed so as to extend rearward within the front chamber R1 from near the bumper B toward the front section of the battery frame 12. In one example of the present invention, the sub frame 4 functions as a load reduction frame.

The driving unit 5 includes, for instance, a motor that is driven by electric power supplied from the batteries 3 and is coupled to, for instance, tires within the front chamber R1.

Furthermore, a load absorber 17 is disposed between the sub frame 4 and the battery frame 12.

Figure 2:
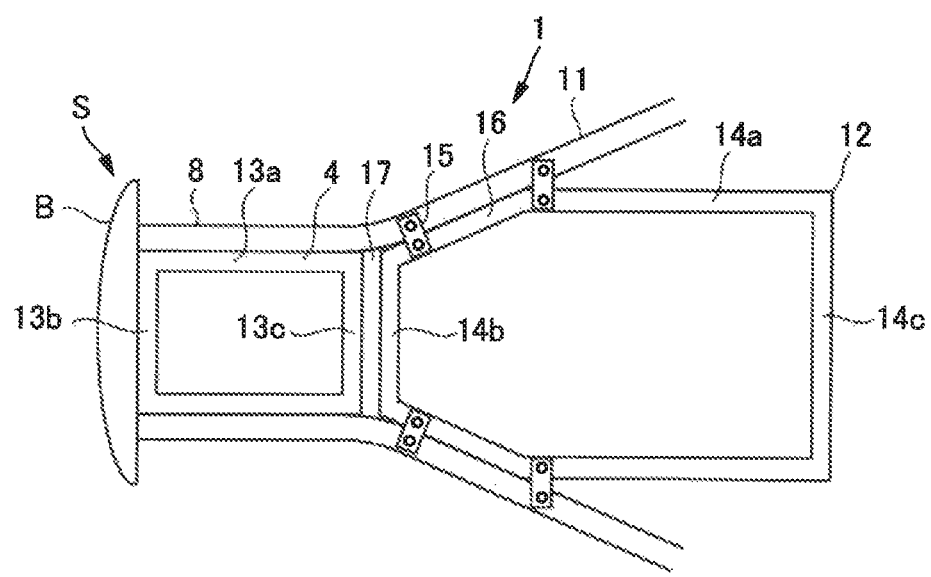
FIG. 2 is a bottom view illustrating a relevant part of the impact load reduction structure.
Figure 3:
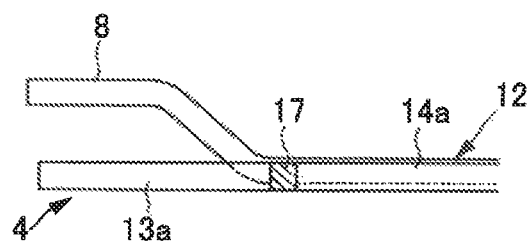
FIG. 3 is a side view illustrating a relevant part of the impact load reduction structure.

FIGS. 2 and 3 illustrate the configuration of the sub frame 4 and the load absorber 17 in detail.

The sub frame 4 and the load absorber 17 are disposed so as to be positioned in the same plane as the battery frame 12. The battery frame 12 has a pair of side frames 14a extending in the front-rear direction at the opposite sides of the electric vehicle, a front frame 14b extending in the vehicle width direction and coupling the front ends of the side frames 14a to each other, and a rear frame 14c extending in the vehicle width direction and coupling the rear ends of the side frames 14a to each other. The side frames 14a, the front frame 14b, and the rear frame 14c are disposed so as to be positioned in substantially the same plane within the floor side frames 11.

The front sections of the side frames 14a have abutment sections 16 extending along the floor side frames 11. The abutment sections 16 are formed such that the side frames 14a are inwardly inclined toward the front. Specifically, the abutment sections 16 are formed such that the distance therebetween gradually decreases toward the front. The rear sections of the side frames 14a extend straight toward the rear. The front frame 14b extends in the vehicle width direction along the toe board T, and the rear frame 14c extends in the vehicle width direction. A plurality of fixation sections 15 are disposed below the battery frame 12. These plurality of fixation sections 15 couple and fix the battery frame 12 to the floor side frames 11.

When a forward inertia force occurs in the battery frame 12 due to a collision of the electric vehicle, the sub frame 4 supports the battery frame 12 from the front side. The sub frame 4 has f side frames 13a in pairs extending in the front-rear direction at the opposite sides of the electric vehicle, a front frame 13b that extends in the vehicle width direction and couples the front ends of the side frames 13a to each other, and a rear frame 13c that extends in the vehicle width direction and couples the rear ends of the side frames 13a to each other.

The side frames 13a are formed parallel to each other and extend rearward and straight from the front ends toward the rear ends. Furthermore, the side frames 13a are disposed such that the front ends of the side frames 14a of the battery frame 12 are positioned on the extensions of the side frames 13a. The front frame 13b and the rear frame 13c are disposed so as to extend parallel to the front frame 14b of the battery frame 12 in the vehicle width direction. The sub frame 4 is coupled and fixed to the front side frames 8 via fixation sections (not illustrated).

The load absorber 17 absorbs an impact load input to the battery frame 12 by deforming and is disposed so as to extend in the vehicle width direction between the battery frame 12 and the sub frame 4. The opposite ends of the load absorber 17 are fixed to the floor side frames 11. The load absorber 17 has lower rigidity than the battery frame 12 and higher rigidity than the sub frame 4. In detail, the rigidity of the load absorber 17 is set such that the load absorber 17 deforms immediately before receiving an impact load that may lead to damages to the batteries 3. The load absorber 17 may be composed of, for instance, a resin material and aluminum alloy.

Next, the operation according to this example will be described.

Figure 4:
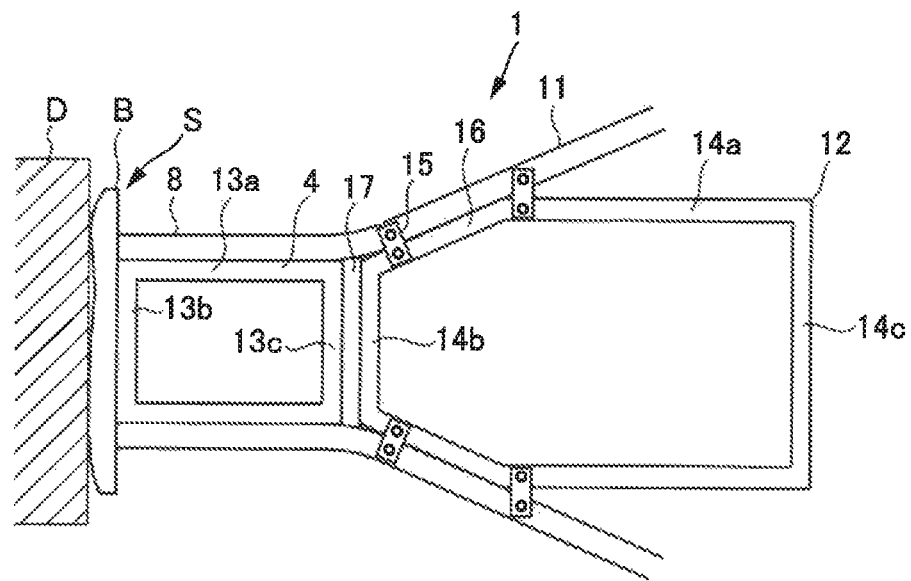
FIG. 4 illustrates a state where a bumper is deformed in an early stage of a collision in the first example.

First, when the front section of the electric vehicle illustrated in FIG. 1 makes a collision, such as a full-wrap frontal collision, with an impactor D, the front section of the electric vehicle receives an impact load. As illustrated in FIG. 4, in the early stage of the collision, the crash area S of the bumper B deforms in a crushed manner, whereas other areas of the vehicle body frame 1 hardly deform. The impact load input from the bumper B is transmitted rearward via the front upper frames 7, the front side frames 8, and the sub frame 4.

In detail, the impact load input to the front upper frames 7 is transmitted to the side sills 10 via the front pillars 9. Furthermore, the impact load input to the front side frames 8 is transmitted to the floor side frames 11 and also to the side sills 10 via the rigid member R. Moreover, the impact load input to the sub frame 4 is transmitted to the front side frames 8 via fixation sections (not illustrated) and is transmitted from the front side frames 8 to the floor side frames 11 and the side sills 10.

In this case, as illustrated in FIGS. 2 and 3, the sub frame 4 is coupled to the battery frame 12 via the load absorber 17 so that a portion of the impact load transmitted to the sub frame 4 is also transmitted to the battery frame 12. However, the impact load transmitted to the battery frame 12 does not lead to damages to the batteries 3 and does not cause the load absorber 17 to deform so that the shape thereof is maintained.

In the battery frame 12, a forward inertia force is generated due to the collision so that the abutment sections 16 are brought into abutment with the floor side frames 11 and the front frame 14b is brought into abutment with the load absorber 17. Therefore, in the early stage of the collision, the abutment sections 16 are supported by the floor side frames 11, and the sub frame 4 supports the battery frame 12 from the front side via the load absorber 17, so that forward movement of the battery frame 12 can be suppressed.

In this case, the sub frame 4 is pushed rearward by the pressure from the impactor D so that the battery frame 12 can be securely supported. Moreover, since the front ends of the side frames 14a of the battery frame 12 are positioned on the extensions of the side frames 13a of the sub frame 4, the battery frame 12 can be securely supported from the front side.

Furthermore, since the load absorber 17 is disposed parallel to the front frame 14b of the battery frame 12, the load absorber 17 can come into contact with the battery frame 12 with a wide area, whereby the battery frame 12 can be securely supported from the front side. Moreover, since the opposite ends of the load absorber 17 are fixed to the floor side frames 11, the battery frame 12 can be securely supported. By using the fixation sections 15 to fix the front frame 14b of the battery frame 12 to the load absorber 17, the load absorber 17 can also be used as a support frame that supports the battery frame 12 from below.

Furthermore, since forward movement of the battery frame 12 is suppressed by simply disposing the sub frame 4 and the load absorber 17 on the front side of the battery frame 12, it is not necessary to securely fix, for instance, the front frame 14b of the battery frame 12 to the vehicle body frame 1, thereby reducing the weight of the electric vehicle as well as simplifying the assembly process thereof.

Accordingly, when the crash area S of the bumper B completely deforms so that the early stage of the collision ends, areas of the vehicle body frame 1 other than the crash area S subsequently deform. Then, in the later stage of the collision in which there are few deformed sections in the vehicle body frame 1 due to complete deformation of the front chamber R1 of the vehicle, the impact load input to the battery frame 12 greatly increases.

In this later stage of the collision, when the impact load to be input to the battery frame 12 increases to a predetermined threshold value, that is, a value slightly lower than a value that may lead to damages to the batteries, 3, the load absorber 17 deforms in a crushed manner so as to absorb the impact load, thereby reducing the impact load input to the battery frame 12. Therefore, the battery frame 12 is prevented from receiving an impact load that greatly exceeds the predetermined threshold value, thereby preventing damages to the batteries 3.

Because the sub frame 4 moves rearward as the load absorber 17 deforms, the battery frame 12 is supported from the front side by the sub frame 4 even after the deformation of the load absorber 17, so that forward movement of the battery frame 12 can still be suppressed.

According to this example, since the load absorber 17, which has lower rigidity than the battery frame 12 and higher rigidity than the sub frame 4, is disposed between the sub frame 4 and the battery frame 12, the impact load input to the battery frame 12 in the later stage of the collision can be reduced, so that the impact load transmitted to the batteries 3 can be reliably reduced.

Second Example

In the first example, the load absorber 17 has lower rigidity than the battery frame 12 and higher rigidity than the sub frame 4. Alternatively, the sub frame 4 may have lower rigidity than the battery frame 12, and the load absorber 17 may have lower rigidity than the sub frame 4.

Similar to the first example, when the front section of the electric vehicle illustrated in FIG. 1 collides with the impactor D, the crash area S of the bumper B deforms in a crushed manner. Moreover, the impact load input from the bumper B is transmitted rearward via the front upper frames 7, the front side frames 8, and the sub frame 4.

In this case, since the load absorber 17 has lower rigidity than the sub frame 4, transmission of the impact load from the sub frame 4 to the battery frame 12 is reduced, so that the battery frame 12 receives only a portion of the impact load transmitted through the floor side frames 11. Therefore, in the early stage of the collision, the battery frame 12 is prevented from receiving the impact load at once, thereby reducing an increase in the impact load.

Figure 5:
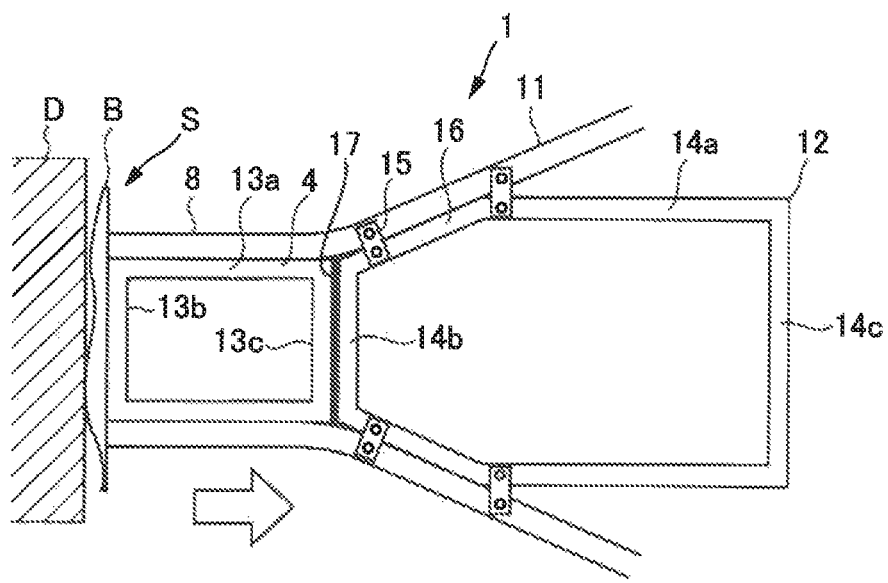
FIG. 5 illustrates a state where a load absorber is deformed in an early stage of a collision in a second example.

Subsequently, when the crash area S of the bumper B completely deforms so that the early stage of the collision ends, the sub frame 4 is pushed rearward by the pressure from the impactor D, as illustrated in FIG. 5. In this case, since the sub frame 4 moves rearward while deforming the load absorber 17, the impact load is absorbed by the load absorber 17 so that the impact load transmitted to the battery frame 12 can be reduced.

Accordingly, the sub frame 4 moves rearward so that the load absorber 17 deforms in a completely crushed manner. It is preferable that the load absorber 17 completely deforms substantially simultaneously with the end of the early stage of the collision, that is, complete deformation of the crash area S. When the early stage of the collision ends, areas of the vehicle body frame 1 other than the crash area S deform so that the deformation load becomes larger than the deformation load of the crash area S. Therefore, although the forward inertia force occurring in the battery frame 12 increases, the sub frame 4 can securely support the battery frame 12 from the front side by causing the load absorber 17 to completely deform when the early stage of the collision ends, whereby forward movement of the battery frame 12 can be reliably suppressed.

In the related art, in order to prevent the battery frame 12 from moving forward due to a collision, for instance, the front frame 14b is securely fixed to the vehicle body frame 1. Therefore, there is a possibility that a large impact load is transmitted to the battery frame 12 at once via the vehicle body frame 1 from the early stage of the collision. In each example of the present invention, the load absorber 17 is disposed between the sub frame 4 and the battery frame 12 so that forward movement of the battery frame 12 is suppressed while the impact load transmitted to the battery frame 12 in the early stage of the collision can be reduced.

According to this example, since the sub frame 4 has lower rigidity than the battery frame 12, and the load absorber 17 has lower rigidity than the sub frame 4, the impact load input to the battery frame 12 in the early stage of the collision can be reduced, so that the impact load transmitted to the batteries 3 can be reliably reduced.

Although the opposite ends of the load absorber 17 are fixed to the floor side frames 11 in the first and second examples described above, the opposite ends may alternatively be fixed to, for instance, the front side frames 8 and the side sills 10 as long as the load absorber 17 can be fixed to the vehicle body of the electric vehicle.

Furthermore, in the first and second examples described above, a part of the vehicle body frame 1 may be used as the load absorber 17. For instance, a cross member disposed between the sub frame 4 and the battery frame 12 may be used as the load absorber 17.

Furthermore, although the impact load reduction structure according to each example of the present invention is applied to an electric vehicle in the above-described example, a vehicle to which the impact load reduction structure according to each example of the present invention is applied is not limited to an electric vehicle so long as the impact load reduction structure according to each example of the present invention is applied to an electrically-powered vehicle equipped with a large-capacity battery for, for instance, electrically driving a driving unit. For instance, the impact load reduction structure according to each example of the present invention may be applied to a hybrid vehicle.

The invention claimed is:

1. An impact load reduction structure configured to reduce an impact load transmitted to a battery of an electrically-powered vehicle, the impact load reduction structure comprising:
    a crash area that is disposed in a front section of the electrically-powered vehicle and configured to deform at a collision of the vehicle;
    a battery frame that is disposed rearward of the crash area and engaged with a vehicle body frame of the electrically-powered vehicle, the battery frame being configured to support the battery and be engaged with the vehicle body frame in accordance with an inertia force of the collision;
    a load reduction frame that extends in a front side of the battery frame and that is disposed in a substantially same plane as the battery frame, the load reduction frame having a lower rigidity than a rigidity of the battery frame; and
    a load absorber that is disposed between the load reduction frame and the battery frame and that has a lower rigidity than the rigidity of the battery frame, to deform by being pushed by the load reduction frame, the load absorber absorbing the impact load to be transmitted from the load reduction frame to the battery frame,
    wherein the load reduction frame extends between the battery frame and the crash area, and is movable rearward by being pushed after a deformation of the crash area, such that the load reduction frame supports the battery frame from frontward via the deformed load absorber.

2. The impact load reduction structure according to claim 1, wherein the battery frame is disposed under a floor of a vehicle cabin, and the load reduction frame is disposed so as to extend between the front section of the electrically-powered vehicle and a rear section of the electrically-powered vehicle.

3. The impact load reduction structure according to claim 1, wherein the vehicle body frame includes:
    front side frames in pairs spaced apart from each other in a vehicle width direction and extending between the front section of the electrically-powered vehicle and a rear section of the electrically-powered vehicle;
    floor side frames in pairs that are coupled to rear ends of the front side frames and that extend rearward under a floor of the vehicle cabin; and
    side sills in pairs disposed so as to extend in a front-rear direction of the vehicle alongside the floor side frames, and
    wherein the load absorber is disposed so as to extend in the vehicle width direction, and opposite ends of the load absorber are engaged with one of the pair of front side frames, the pair of side sills, and the pair of floor side frames.

4. The impact load reduction structure according to claim 2, wherein the vehicle body frame includes:
    front side frames in pairs spaced apart from each other in a vehicle width direction and extending between the front section of the electrically-powered vehicle and a rear section of the electrically-powered vehicle;
    floor side flames in pairs that are coupled to rear ends of the front side frames and that extend rearward under the floor of the vehicle cabin; and
    side sills in pairs disposed so as to extend in a front-rear direction of the vehicle alongside the floor side frames, and
    wherein the load absorber is disposed so as to extend in the vehicle width direction, and opposite ends of the load absorber are engaged with one of the pair of front side frames, the pair of side sills, and the pair of floor side frames.

5. The impact load reduction structure according to claim 1, wherein the vehicle body frame includes:
    front side frames in pairs spaced apart from each other in a vehicle width direction and extending between the front section of the electrically-powered vehicle and a rear section of the electrically-powered vehicle; and
    floor side frames in pairs coupled to rear ends of the front side frames and extending rearward under a floor of a vehicle cabin,
    wherein the load reduction frame is engaged with the front side frames, and
    wherein the battery frame is disposed within the floor side frames and is engaged with the floor side frames.

6. The impact load reduction structure according to claim 2, wherein the vehicle body frame includes:
    front side frames in pairs spaced apart from each other in a vehicle width direction and extending between the front section of the electrically-powered vehicle and a rear section of the electrically-powered vehicle; and
    floor side frames in pairs coupled to rear ends of the front side frames and extending rearward under the floor of the vehicle cabin,
    wherein the load reduction frame is engaged with the front side frames, and wherein the battery frame is disposed within the floor side frames and is engaged with the floor side frames.

7. The impact load reduction structure according to claim 3, wherein the vehicle body frame includes:
front side frames in pairs spaced apart from each other in a vehicle width direction and extending between the front section of the electrically-powered vehicle and a rear section of the electrically-powered vehicle; and
floor side frames in pairs coupled to rear ends of the front side frames and extending rearward under the floor of the vehicle cabin,
wherein the load reduction frame is engaged with the front side frames, and
wherein the battery frame is disposed within the floor side frames and is engaged with the floor side frames.

8. The impact load reduction structure according to claim 4, wherein the vehicle body frame includes:
front side frames in pairs spaced apart from each other in a vehicle width direction and extending between the front section of the electrically-powered vehicle and a rear section of the electrically-powered vehicle; and
floor side frames in pairs coupled to rear ends of the front side frames and extending rearward under the floor of the vehicle cabin,
wherein the load reduction frame is engaged with the front side frames, and
wherein the battery frame is disposed within the floor side frames and is engaged with the floor side frames.

\* \* \* \* \*